United States Patent [19]
Dean et al.

[11] 4,272,366
[45] Jun. 9, 1981

[54] HEAVY DUTY TWO MASS VIBRATORY MACHINE

[75] Inventors: Arthur L. Dean; William L. Wine, both of Indiana, Pa.

[73] Assignee: FMC Corporation, San Jose, Calif.

[21] Appl. No.: 67,000

[22] Filed: Aug. 16, 1979

[51] Int. Cl.³ .............................................. B07B 1/42
[52] U.S. Cl. ................. 209/364; 209/305 R; 74/61; 198/763
[58] Field of Search ........... 209/367, 415, 346, 365 B, 209/326, 363, 364, 365 R, 365 A, 344, 325; 74/61 P; 198/760, 763, 770

[56] References Cited

U.S. PATENT DOCUMENTS

| 2,148,139 | 2/1939 | Symons | 209/367 X |
| 2,701,061 | 2/1955 | Kluge | 209/365 B X |
| 2,831,576 | 4/1958 | Wehmer | 209/415 X |
| 3,032,175 | 5/1962 | Thomas | 198/763 |
| 3,203,264 | 8/1965 | Evans | 74/61 |
| 3,583,553 | 6/1971 | Spurlin | 798/763 |

FOREIGN PATENT DOCUMENTS

| 1106537 | 5/1961 | Fed. Rep. of Germany | 198/763 |
| 1950272 | 4/1971 | Fed. Rep. of Germany | 209/367 |
| 984775 | 2/1965 | United Kingdom | 198/770 |

WO79/00-453 12/1978 PCT Int'l. Appl.

Primary Examiner—Robert Halper
Attorney, Agent, or Firm—Jack W. Edwards; Robert S. Kelly

[57] ABSTRACT

A two-mass heavy duty vibratory machine has a frame in the form of a box-like cage in which a working member, such as a screen, is received. In one embodiment of the disclosure, the frame is resiliently mounted on a stationary support surface and the working member is resiliently suspended from the frame. In another embodiment of the disclosure, the working member is resiliently mounted on the stationary support surface and the frame is suspended from the working member. In both embodiments, an exciter is mounted on the frame at a location outside the frame and spaced from the working member.

4 Claims, 6 Drawing Figures

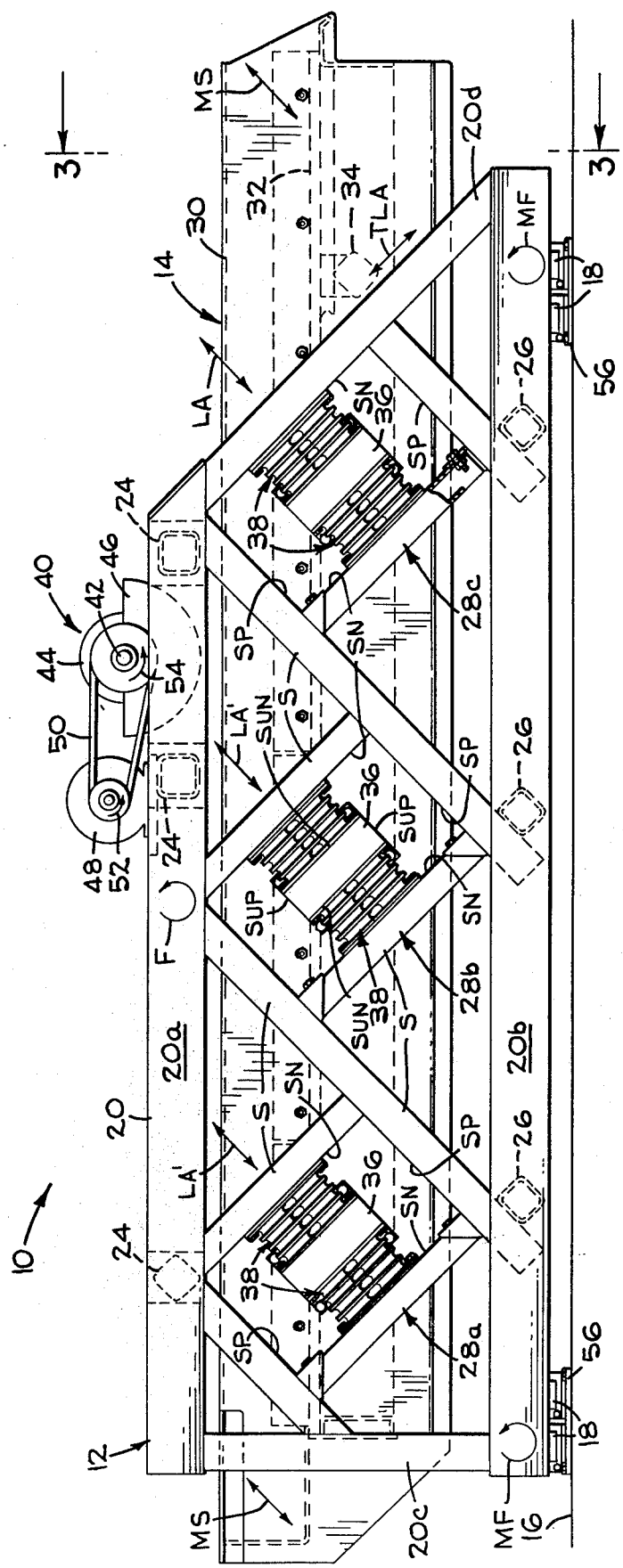
FIG_1

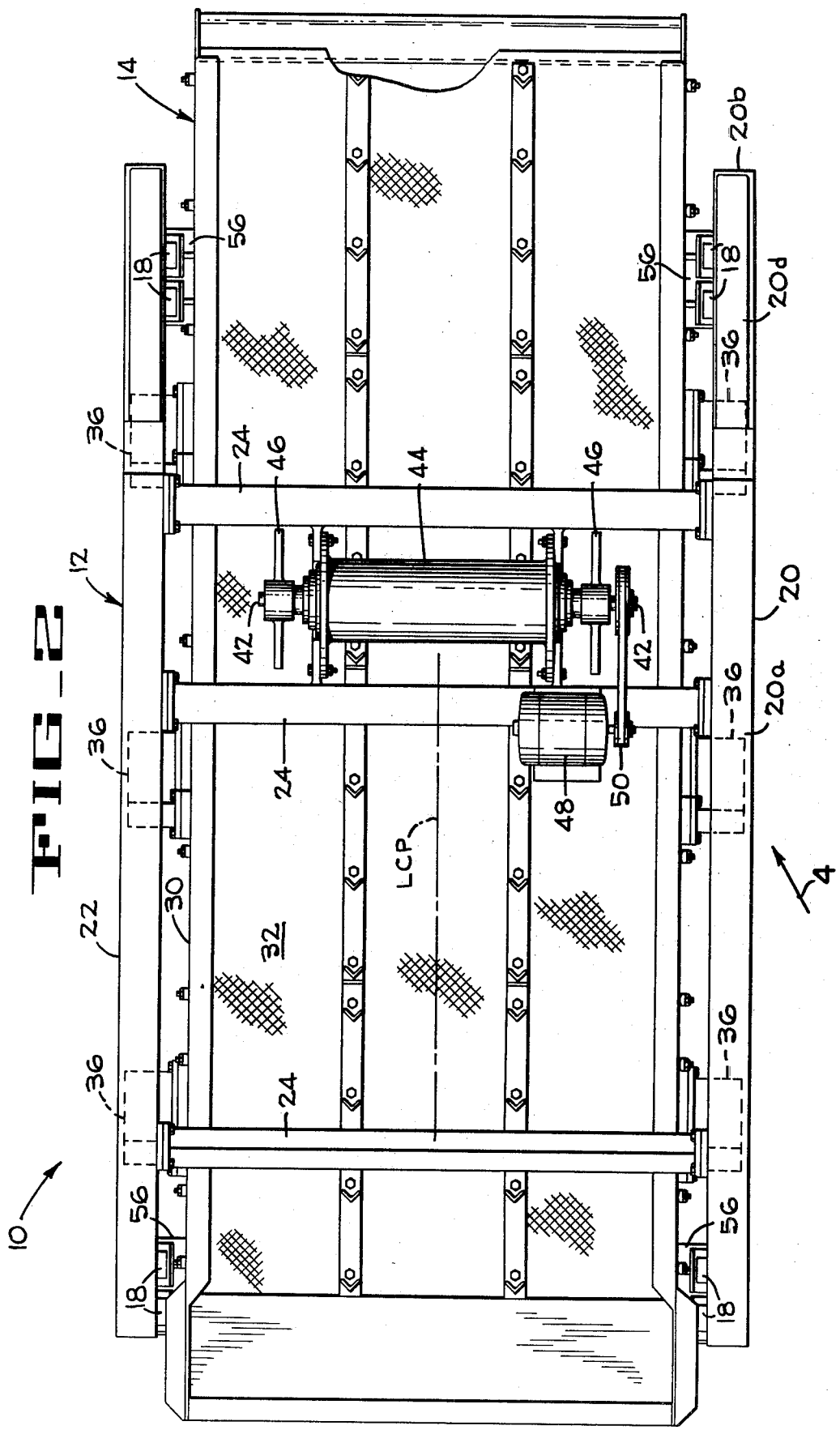

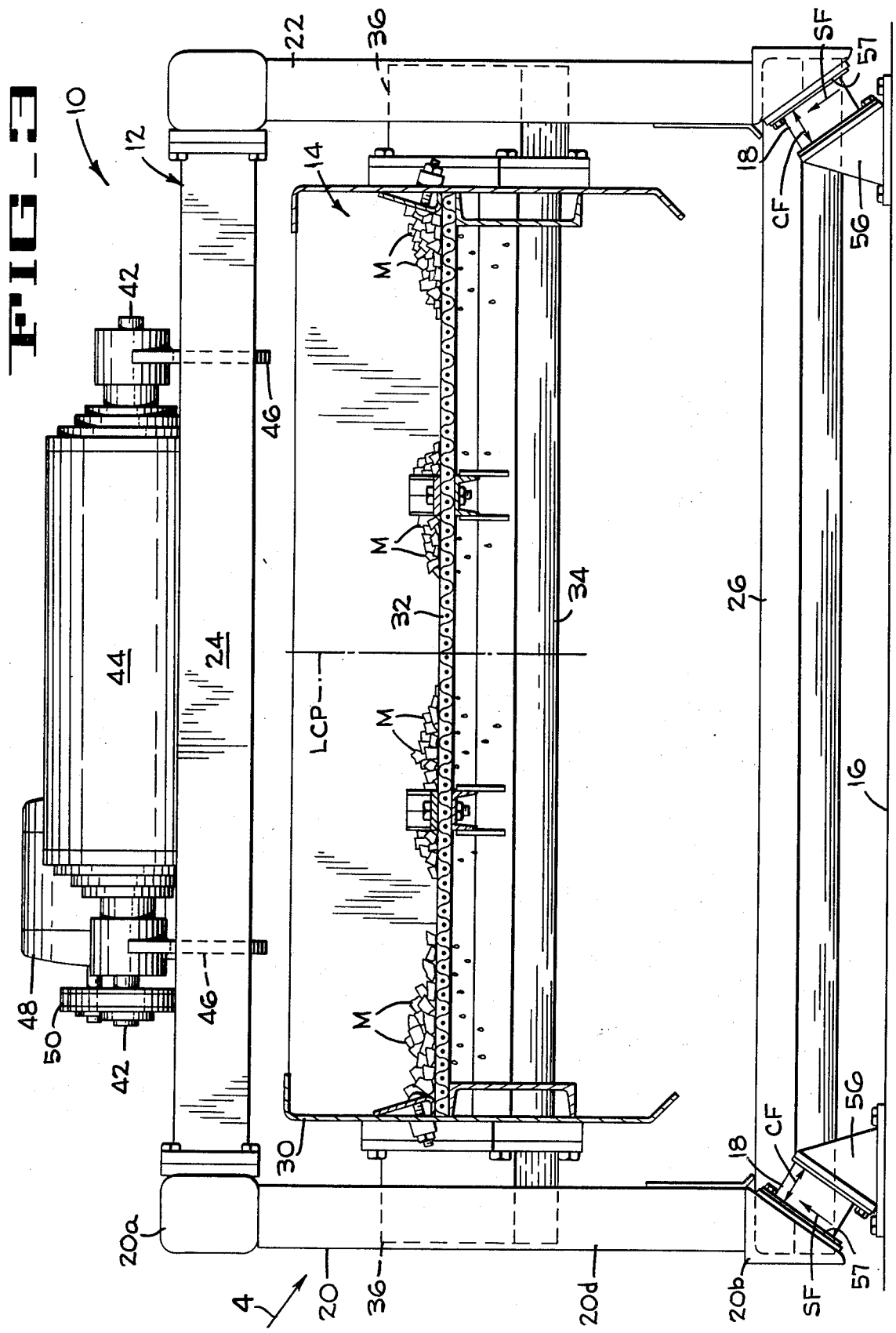

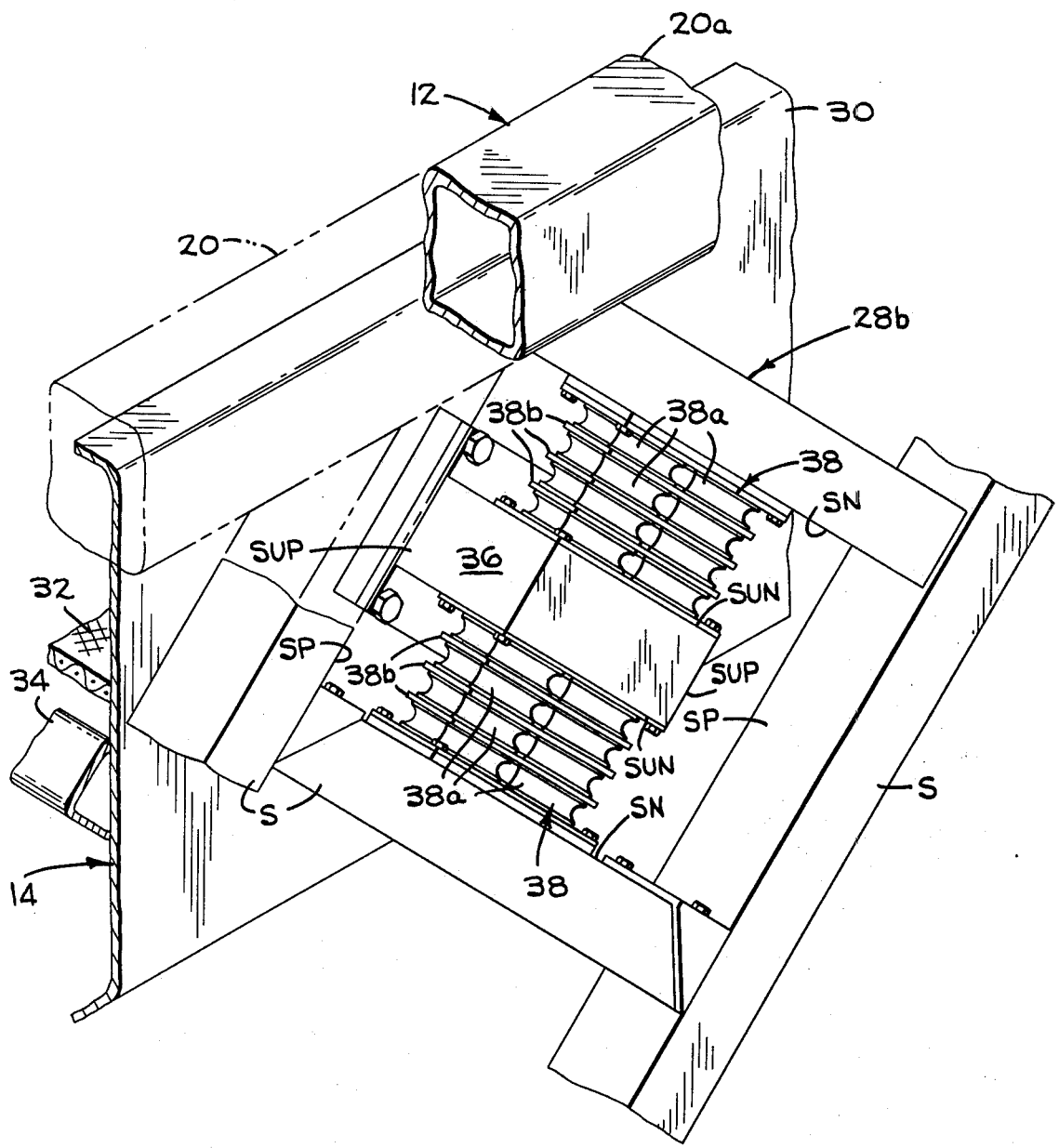
FIG_4

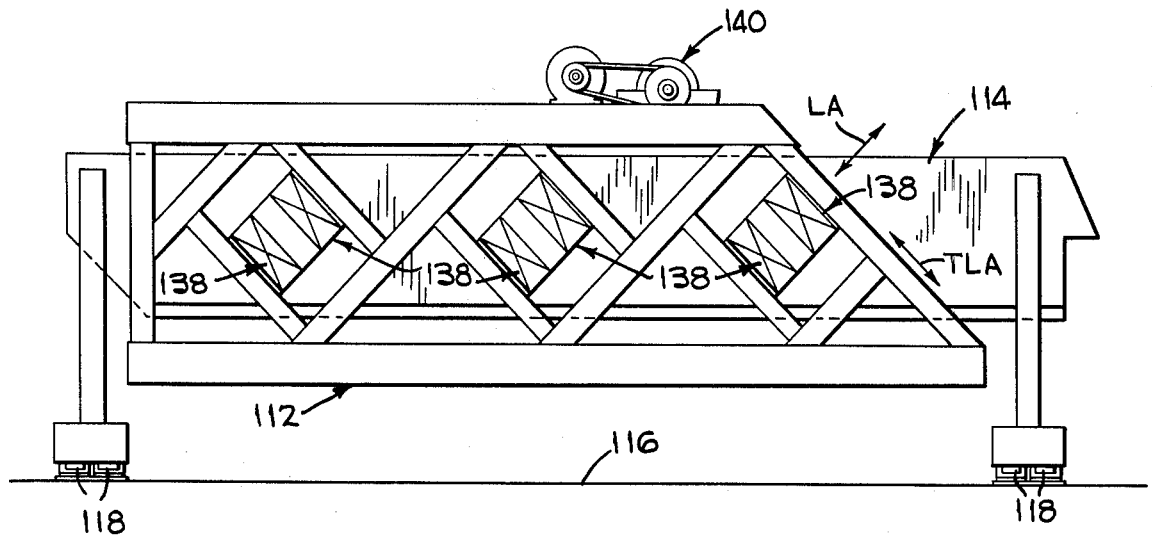
FIG_5
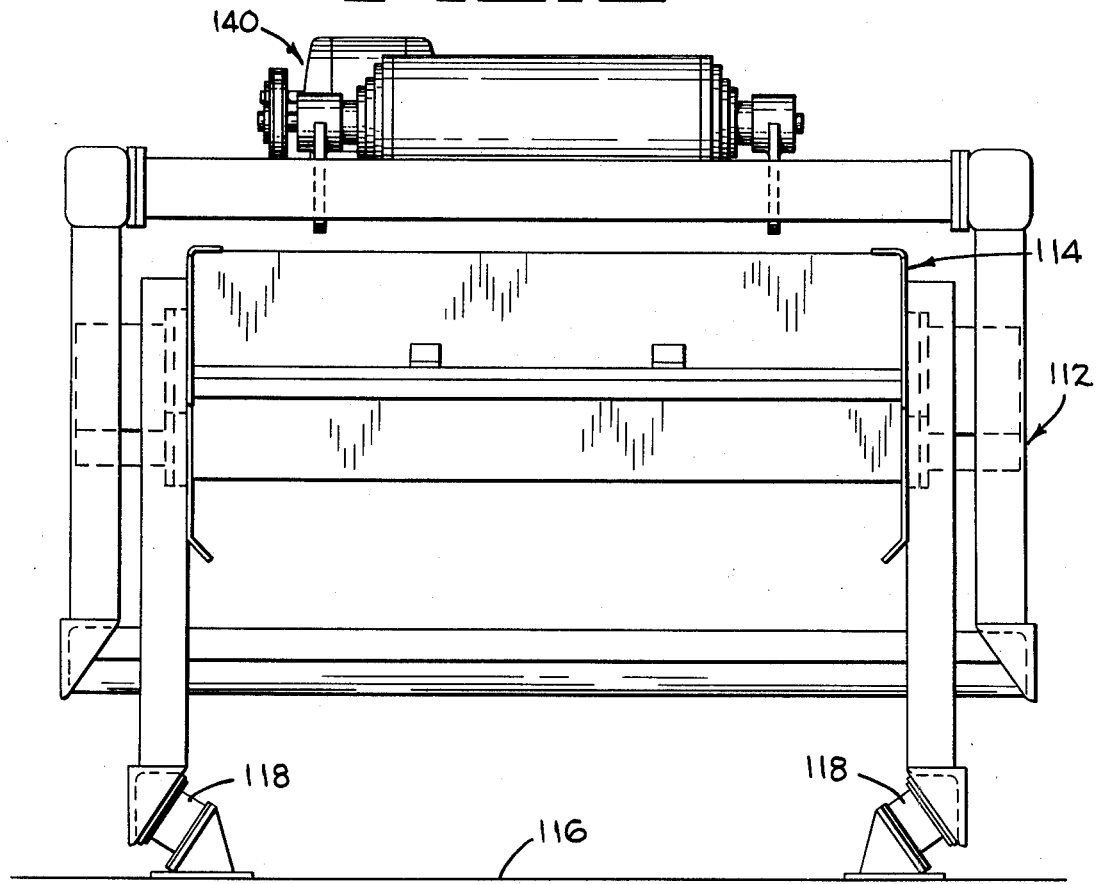
FIG_6

HEAVY DUTY TWO MASS VIBRATORY MACHINE

BACKGROUND OF THE INVENTION

1. Field of the Invention

The present invention pertains to vibrator mounting structures and, more particularly, it pertains to a mounting for a vibrator used to excite a two-mass vibratory system.

2. Description of the Prior Art

Vibrators have been used for many years in the industrial field for vibrating working members, such as screens, feeders, conveyors and separators, for example. These vibrators typically are comprised of a rotating shaft having one or more eccentric weights attached thereto for generating a rotating force vector through the bearings which support the shaft and connect it with the surrounding structure.

By far the most common method of mounting such rotary vibrator structures upon the object to be vibrated is the so-called "brute force" system. In such a system, the vibrator supporting structure is mounted directly to the object to be vibrated so that the rotating force vector, such as might be transmitted from an eccentrically weighted shaft, will be passed directly from the supporting bearings to the working member in which a vibratory motion is desired. One common problem with which this typical method of mounting a rotary vibrator is afflicted, is that the direction of the vibratory motion is limited by the manner in which the vibrator is connected to the vibrated object.

In order to obtain relatively linear motion, as opposed to the circular motion normally achieved by the "brute force" vibratory systems, vibrators in recent years, in certain applications, have utilized elastic members which are relatively rigid in the direction in which the vibratory motion is desired to be directed and which are flexible in the transverse direction, so that little, if any, vibratory force is transmitted transversely. A typical example of such a structure is provided by the United States patent to Musschoot U.S. Pat. No. 2,984,339 which discloses a vibratory feeder that includes a set of air springs for mounting the rotary vibrator structure to the conveyor structure.

An even more recent improvement has been the use of elastomeric members for mounting the exciting vibrator to the object to be vibrated. For example, the United States patent to Bruderlein U.S. Pat. No. 3,417,630; Maeder et al U.S. Pat. No. 3,212,629; and Makino U.S. Pat. No. 3,396,294 all disclose rotary vibrator structures which are connected to the object to be vibrated by means of elastomeric blocks.

In U.S. Pat. No. 3,703,236 a mounting to control the direction of vibration in a two-mass system is disclosed.

Vibratory linear motion screens are commonly driven by either of two basic means. The first means comprises a crank arm driven by an eccentric shaft, wherein the crank arm connects either a fixed or resiliently mounted frame to a screen box and thereby imparts motion to the frame or box. The second means comprises counter rotating dual shafts with eccentric weights to oscillate the screen in a direction parallel to a line between the shaft centers or in a direction transverse to said line between the shaft centers depending on the relative orientation of the respective counterweights on the dual shafts.

The patents 3,583,553 and 3,703,236 show two-mass vibratory mechanisms.

SUMMARY OF THE INVENTION

The present invention is illustrated in the form of a heavy duty screen conveyor which moves material from one point to another and, at the same time, removes water from the material. It will be understood, however, that vibratory machines constructed in accordance with the present invention can be used to convey material without dewatering, separate size fractions and convey material, or for any other purpose for which conventional vibratory machines are used.

In accordance with the present invention, there is provided a vibratory machine for mounting to a stationary support, said vibratory machine having a working member to be driven for oscillation along a predetermined linear path, a frame member with laterally spaced side portions straddling said working member, means to resiliently mount one of said members to said support, means defining flat seating surfaces on the sides of said working member and on the side portions of said frame member, said seating surfaces normal to said predetermined linear path, elastomer blocks located between opposed seating surfaces on the side portions of the frame member and the working member, respectively, to be compressed therebetween in the direction of movement of the working member along the predetermined linear path, said vibratory machine having a longitudinal centerline that extends within a vertical plane, and an exciter mounted outside said frame member and spaced from the working member, said exciter having a shaft normal to said vertical plane, a motor to rotate said shaft, and on the shaft at least one eccentric weight that upon rotation induces orbital motion of the frame member in planes parallel to said vertical plane, said elastomer blocks converting the orbital motion from the frame member to oscillating linear motion of the working member along the predetermined linear path.

It is therefore one object of the present invention to provide a sturdy vibrator which produces a substantially linear motion of the working member.

It is another object of the present invention to provide support between the working member and frame at four corners of the frame.

It is yet another object of the present invention to provide a frame in the form of a box-like cage which surrounds the working member for motion along a substantially linear line of action.

BRIEF DESCRIPTION OF THE DRAWINGS

FIG. 1 is a side elevation of the two-mass heavy duty vibratory machine of the present invention.

FIG. 2 is a plan view of the machine of FIG. 1.

FIG. 3 is a transverse section taken along line 3—3 of FIG. 1.

FIG. 4 is a perspective view taken in the direction of arrows 4 of FIGS. 2 and 3.

FIG. 5 is a side elevation of a second embodiment of a two-mass heavy duty vibratory machine.

FIG. 6 is an end elevation of the machine of FIG. 5.

DESCRIPTION OF THE PREFERRED EMBODIMENTS

In the preferred form of the present invention, the vibratory machine 10 has a frame 12 and a working member in the form of a screen 14. The frame is resiliently mounted on a horizontal stationary support surface 16 by means of elastomer blocks 18 (see FIG. 3).

The frame 12 constitutes a box-like cage having a rectangular cross section, as shown in FIG. 3. The frame, which has a vertical, longitudinal, center plane LCP, has spaced apart side portions 20,22, each parallel to the plane LCP. The frame also has upper cross portions 24 and lower cross portions 26.

The desired motion of the working member 14 for the screen conveyor disclosed is an oscillating linear movement in translation, with every part of the screen 14 reciprocating on a line LA' parallel to the line of action, indicated at LA.

The side portions 20 and 22 are similar, and only the portion 20 will be described. Portion 20 has an upper member 20a, a lower member 20b parallel to member 20a, and two end members 20c and 20d. Connected between these four frame members is a rigid network of struts S formed into three right-angled rectangles 28a, 28b, and 28c. Each rectangle has two sides SP parallel to the desired action line LA of the screen, and has two sides SN normal to the desired action line LA of the screen.

The working member 14 consists of a trough portion 30 to receive material M (FIG. 3), screening material such as a wire cloth screen 32 to support the material as water is driven therefrom, and lateral support bars 34 to support the screen. As shown best in FIGS. 2 and 4, the working member 14 has 3 tangs 36 extending laterally from one side. Each tang is angled to provide two surfaces SUP parallel to the line of action LA and two surfaces SUN normal to the line of action LA. Elastomer blocks 38 are mounted under compression between the surfaces SN of the frame struts S and the surfaces SUN of the screen tangs. The surfaces SN and the surfaces SUN are flat and define seating surfaces for the flat, parallel surfaces of the blocks 38.

The elastomer blocks, which are known heretofore and may be of the type shown and described in U.S. Pat. No. 3,703,236. The block consists of rectangular slabs 38a separated by aluminum plates 38b. The blocks are thicker, in the direction of the line of action LA, when connected to tang 36 than is provided in the rectangles 28a, 28b and 28c so that they must be compressed prior to connection to the struts SN.

With the above described connection between the frame and the screen which comprises six tangs on the screen, six rectangles on the frame, and elastomer block between the screen tangs and the frame rectangles, the screen is supported along its entire length, and on each side, by the frame. In addition, the screen is supported at each corner of the frame (see FIG. 2).

An exciter 40 is mounted on a pair of the upper cross portions 24 of the frame. The exciter has a cross-shaft 42 mounted in a bearing housing 44. The cross-shaft 42, normal to the vibrator central longitudinal plane LCP, has an eccentric weight 46 on each end, and is driven by a motor 48 through a drive belt 50. The eccentric weights therefore each rotate in planes parallel to plane LCP.

The motor and the eccentric weight, which rotate in the directions indicated by arrows 52,54 in FIG. 1, impart to every portion of the frame a force F which continuously changes direction through 360°, as indicated in FIG. 1, and imparts movement to the frame only parallel to plane LCP.

The box-like cage frame 12 is supported, at each corner, on surface 16, through the rubber, or elastomer blocks, 18. Each block (FIG. 3) is mounted on a support foot 56 at an angle, and each side portion 20,22 of the frame has an inclined face 57 for connection to the block 18. Thus, the weight of the frame 12 and working member 14, acting vertically, is resisted partially by shear forces SF in the block 18 and partially by compressive forces CF in the blocks 18.

It is well known that compressive forces in an elastomer block provide very stiff resistance to forces acting on the block normal to the block faces in contact with seating faces on which the block is mounted. It is also well known that shear forces, which are perpendicular to the compressive forces, offer little, or "soft", resistance to forces acting parallel to the block faces in contact with the seating faces on which the block is mounted. Thus, the springs defined by elastomer blocks 18 constitute neither stiff nor soft springs for the machine, but only intermediate springs. The force F acting on the frame and constantly changing direction through 360° meets only the intermediate resistance of the springs 18. Thus, the frame 12 vibrates with a motion always parallel to the vertical longitudinal center plane LCP of the machine.

The motion MF of the frame is an orbiting motion in translation (that is, an orbiting motion in which all the points of the moving frame have at any instant the same velocity and direction of motion). Because of the orientation of the exciter eccentric weights, which lie in planes parallel to the longitudinal central plane LCP of the machine, all forces generated by the exciter are parallel to the plane LCP, and all motion produced in the frame is parallel to the plane LCP.

Thus, it will be seen that the preferred form of the vibratory machine of the present invention consists of a two-mass system having a frame with exciter resiliently mounted on a stationary support, and having a screen box resiliently mounted to the frame only. The frame has spaced side members aligned parallel to one another and perpendicular to the desired direction LA of screen box motion. The screen box has laterally extending rigid tangs which protrude between parallel members on the side frame. Rubber springs, consisting of a plurality of rubber slabs sandwiched between aluminum or steel plates, are mounted on each side of the tangs and resiliently support the screen box with respect to the frame. The frame has removable tubular sections so that the rubber springs can be precompressed to maintain a compressed state during operation. In other words, the springs are never extended to a total length greater than their free length. The mounted springs are widely distributed along the length of the frame within the spaced side members and are oriented such that the stiffer spring rate is parallel to the desired direction of motion LA and the lower rate, $\frac{1}{8}$ to 1/12th the stiffer spring, is perpendicular to the desired direction of motion of the screen box. A single shaft on which eccentric weights are hung is mounted on the frame, and is coupled via sheaves and belt to a constant frequency motor also mounted on the frame. Thus, an inexpensive drive system, having a single shaft, can be advantageously used in the system of the present invention.

In operation of the preferred embodiment, the motor driven eccentrics impart radial forces throughout their 360° of rotation, resulting in circular and/or elliptical motion MF of every portion of the frame. The exciter frame forces that occur parallel to the desired line of action for the screen box are not only transmitted through the resilient blocks to the screen box, but are amplified as well, due to the design of the two-mass system operating at near resonance. Exciter forces normal to the desired angle of motion are effectively decoupled from the screen by the low rate of force transmission in shear by the resilient blocks, thus producing essentially straight line motion MS of every portion of the screen box parallel to the desired line of action LA. This straight line motion is uniform along the screen box length and remains stable even under loaded conditions.

The two-mass design, timed to operate near resonance, inherently requires less input force than a comparably sized single mass design machine; thus requiring less energy to operate and permitting lighter designs in the drive connection area.

System forces developed at the desired operating speed and strokes are distributed along the length of the screen box and frame on each side parallel to LCP. This force distribution permits a lighter weight screen box design than is practical in brute force design.

The uniform direction of motion of the screen box provides a stable, constant feed rate of material M with uniform acceleration throughout.

In the preferred embodiment of the invention above described, the frame 12 is resiliently mounted to the stationary support surface 16 by springs 18, and the working member 14 is resiliently suspended from the frame (and spaced from support surface 16) by springs 38, which transmit forces from the frame to the working member in one direction (of line LA) more effectively than in the transverse direction of line TLA.

Many of the advantages of the mechanism above described can be obtained by another, although less preferred, embodiment of the invention. In this embodiment which is shown in FIGS. 5 and 6, the working member 114 is resiliently mounted to the stationary support surface 116 by springs 118, and the frame 112 is resiliently suspended from the working member (and spaced from the support surface 116) by springs 138. In this latter embodiment, the frame is orbited by the exciter 140 in the same manner as the previously described embodiment, and the springs 138 transmit forces from the frame to the working member more effectively in the direction of the desired line of action LA of the screen, than in the transverse direction TLA. Thus, as in the earlier described embodiment, the orbiting motion of the frame produces a substantially linear reciprocation of the working member 114 in the desired direction LA.

Although the best mode contemplated for carrying out the present invention has been herein shown and described, it will be apparent that modification and variation may be made without departing from what is regarded to be the subject matter of the invention.

What is claimed is:

1. A vibratory machine for mounting to a stationary support, said vibratory machine having a working member to be driven for oscillation along a predetermined linear path, a frame member with laterally spaced side portions straddling said working member, means to resiliently mount one of said members to said support, means defining flat seating surfaces on the sides of said working member and on the side portions of said frame member, said seating surfaces being normal to said predetermined linear path, elastomer blocks located between opposed seating surfaces on the side portions of the frame member and the working member, respectively, to be compressed therebetween in the direction of movement of the working member along the predetermined linear path, said vibratory machine having a longitudinal centerline that extends within a vertical plane, and an exciter mounted outside said frame member and spaced from the working member, said exciter having a shaft normal to said vertical plane, a motor to rotate said shaft, and on the shaft at least one eccentric weight that upon rotation induces orbital motion of the frame member in planes parallel to said vertical plane, said elastomer blocks converting the orbital motion from the frame member to oscillating linear motion of the working member along the predetermined linear path.

2. The apparatus of claim 1 in which said stationary support is a support surface and in which said one member is the frame member and in which said working member is suspended between said frame side portions and above said support surface.

3. The apparatus of claim 1 wherein said working member is resiliently mounted to the support, and said frame member is resiliently suspended from the working member.

4. A vibratory machine for mounting on a stationary support surface, said vibratory machine having a longitudinal centerline that extends within a vertical plane, said vibratory machine having a working member to be driven for oscillation along a predetermined linear path that is inclined to the longitudinal centerline of the vibratory machine within said vertical plane, a frame member with laterally spaced side portions straddling the working member, means to resiliently mount the frame member on the support surface, said frame member having laterally spaced opposing side portions with upper and lower cross portions connecting the side portions to form a box-like cage, said frame member having opposed seating surfaces normal to said linear path, said working member having seating surfaces in registration with said frame member seating surfaces, elastomer blocks connected between opposed seating surfaces on both the frame member and the working member, respectively, to be compressed therebetween in the direction of movement of the working member along the predetermined linear path, and an exciter mounted on top of said frame and above the working member, said exciter having a shaft normal to said vertical plane, a motor to rotate said shaft, and on said shaft at least one eccentric weight that upon rotation induces orbital motion of the frame member in planes parallel to said vertical plane, said elastomer blocks converting the orbital motion from the frame member to oscillating linear motion of the working member in the direction of compression of the elastomer blocks.

* * * * *